(12) United States Patent
Schreiber (10) Patent No.: US 10,099,740 B2
(45) Date of Patent: Oct. 16, 2018

(54) PROTECTIVE COVER FOR A DRIVE CHAIN

(71) Applicant: HEBIE GmbH & Co. KG, Bielefeld (DE)

(72) Inventor: Bodo Schreiber, Waldeck (DE)

(73) Assignee: HEBIE GmbH & Co. KG, Bielefeld (DE)

( * ) Notice: Subject to any disclaimer, the term of this patent is extended or adjusted under 35 U.S.C. 154(b) by 209 days.

(21) Appl. No.: 15/232,971

(22) Filed: Aug. 10, 2016

(65) Prior Publication Data

US 2017/0043836 A1 Feb. 16, 2017

(30) Foreign Application Priority Data

Aug. 13, 2015 (DE) .......................... 10 2015 113 391

(51) Int. Cl.
*B62J 13/04* (2006.01)
(52) U.S. Cl.
CPC .................................... *B62J 13/04* (2013.01)
(58) Field of Classification Search
CPC ..... B62J 13/04; B62J 13/00; F16H 2007/185; F16H 55/56; F16H 55/38; F16H 37/0846
See application file for complete search history.

(56) References Cited

U.S. PATENT DOCUMENTS

| 618,945 | A | | 2/1899 | Myers | |
|---|---|---|---|---|---|
| 4,194,413 | A | * | 3/1980 | Hentze | B62J 13/00 474/147 |
| 4,854,924 | A | | 8/1989 | Nagano | |
| 5,779,583 | A | * | 7/1998 | Nakatani | B62J 13/00 198/867.14 |
| D507,995 | S | * | 8/2005 | Okada | B62J 13/04 D12/127 |
| 2007/0152423 | A1 | * | 7/2007 | Waters | B62J 13/00 280/304.3 |
| 2009/0325751 | A1 | * | 12/2009 | Carstensen | B62J 13/04 474/145 |

FOREIGN PATENT DOCUMENTS

| CH | 179633 | 9/1935 |
|---|---|---|
| DE | 37 27 839 | 3/1988 |
| DE | 10 2008 031 803 | 1/2010 |
| EP | 1 795 440 | 6/2007 |
| JP | S4852246 | 7/1973 |

* cited by examiner

*Primary Examiner* — Michael R Mansen
*Assistant Examiner* — Robert T Reese
(74) *Attorney, Agent, or Firm* — Collard & Roe, P.C.

(57) ABSTRACT

A protective cover for a drive chain of a bicycle includes a plurality of protective elements. The plurality of protective elements encompass the drive chain of the bicycle. The protective elements are movable together with the drive chain. At least one stationary cover element also is provided, which covers a gap between a sprocket of the bicycle and the bicycle drive chain. The bicycle drive chain is protected and risk of injury at the gap is reduced by the protective cover.

9 Claims, 9 Drawing Sheets

PROTECTIVE COVER FOR A DRIVE CHAIN

CROSS-REFERENCE TO A RELATED APPLICATION

The invention described and claimed hereinbelow is also described in German Patent Application DE 10 2015 113 391.1, filed on Aug. 13, 2015. The German Patent Application, the subject matter of which is incorporated herein by reference, provides the basis for a claim of priority of invention under 35 U.S.C. 119(a)-(d).

BACKGROUND OF THE INVENTION

The invention relates to a protective cover for a drive chain, for example, for a bicycle. The protective cover has a plurality of protective elements, which encompass the drive chain and are movable together with the drive chain.

CH 179 633 discloses a chain protector for bicycles, in which an envelope made of rubber is arranged around a drive chain. The tubular envelope is used to protect the chain from contaminants, but does not form an engagement protector, so that a region of the sprocket in which the chain runs on the sprocket represents a risk.

A similar chain protector is shown in DE 10 2008 031 803 B4, in which a corrugated tube section is arranged around the drive chain, which encloses the drive chain in a tubular manner. A user also can move an object or a body part into the gap between the drive chain and the sprocket here, so that a risk of injury exists, which is to be avoided in particular for children's bicycles.

A cover device for bicycle drive chains also is known from DE 37 27 839 A1, in which tubular cover elements are not provided, but rather individual clip-shaped cover elements, which are fixable on the chain links. An engagement protector cannot be provided using this cover device.

EP 1 795 440 discloses a protective jacket for protecting the drive chain of a bicycle, in which both the drive pinion and also the drive chain are enveloped by the protective jacket. In such a protective jacket, it is disadvantageous that different protective jackets have to be kept ready in each case for sprockets of different sizes. In the event of a change of the tooth count on a sprocket or the spacing of the two sprockets, different protective jackets have to be kept ready, which is comparatively complex.

SUMMARY OF THE INVENTION

The present invention overcomes the shortcomings of known arts, such as those mentioned above.

The present invention provides a protective cover for a drive chain, which is flexibly adaptable to different sizes of sprockets and ensures a high level of security.

According to an embodiment of the invention, the protective cover has a plurality of protective elements, which encompass the drive chain and are movable together with the drive chain. The chain is thus arranged so it is protected on an outer side and opposing lateral faces, in particular against soiling. In addition, at least one stationary cover element is provided, which covers a gap between a sprocket and the drive chain. An engagement protector is thus provided by the stationary cover element, which prevents objects or body parts from being inserted into the gap between sprocket and drive chain. This feature is particularly advantageous when the drive chain is moved, since objects or body parts can be pinched between the drive chain and the sprocket in the wedge-shaped gap. This is avoided by the stationary cover element, so that an increased amount of security is provided by the protective cover.

Both tubular protective elements, which also can be formed integrally with one another and thus form only a single coherent protective element, or separate protective elements, which are fixed on the drive chain on individual links, can be provided as the protective elements around the drive chain, according to the invention.

The at least one cover element preferably covers both a gap at an intake of the drive chain onto the sprocket and also a gap at an outlet of the drive chain off of the sprocket. Since the drive chain can move in different directions, in particular, in bicycles, both the gap at an intake and also the gap at an outlet of the drive chain are covered by the cover element, so that a complete engagement protector is provided on at least one sprocket. Of course, it also is possible to provide an engagement protector on two sprockets by the at least one cover element, and to do so in each case at an intake and an outlet of the drive chain, so that security from damage or injury is provided at all positions of the drive chain.

The protective elements are preferably guided at the at least one cover element. A receptacle is formed for this purpose on the protective elements, into which at least one guide strip on the cover element is inserted. The guide strip is formed integrally with the cover element or is fixed as a separate component on the cover element in this case. The protective elements preferably each have a receptacle on opposing side walls, in particular, a grooved receptacle, into which the guide strip is inserted. The protective elements can thus be guided displaceably along the guide strip, so that the protective elements and also the chain can be supported against sagging.

In order that a risk of injury can also be avoided in the region of the sprockets, the at least one cover element laterally overlaps the teeth of the sprocket at least in a region in which the drive chain does not wrap around the sprocket.

In a further embodiment, at least two cover elements are provided. A first cover element at least regionally overlaps a first sprocket and a second cover element at least regionally overlaps a second sprocket. The two cover elements are designed in this case as adjustable in relation to one another in length, in particular displaceable. In the event of a change of the spacing between the two sprockets, an adaptation of the position of the cover elements can thus be performed, so that the protective cover can be used flexibly for different bicycle sizes.

Preferably, each protective element is fixable on a chain link, in particular, it is lockable on a chain link. Smooth movement of the protective elements together with the drive chain can thus occur, wherein the individual protective elements preferably overlap one another so that an engagement to the sprocket is securely prevented even at the deflection along a sprocket.

At a lower chain strand of the drive chain, it can be supported between two sprockets by the protective elements, which are displaceable along a guide strip. Sagging of the drive chain at the lower drive strand is thus at least reduced.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawing. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
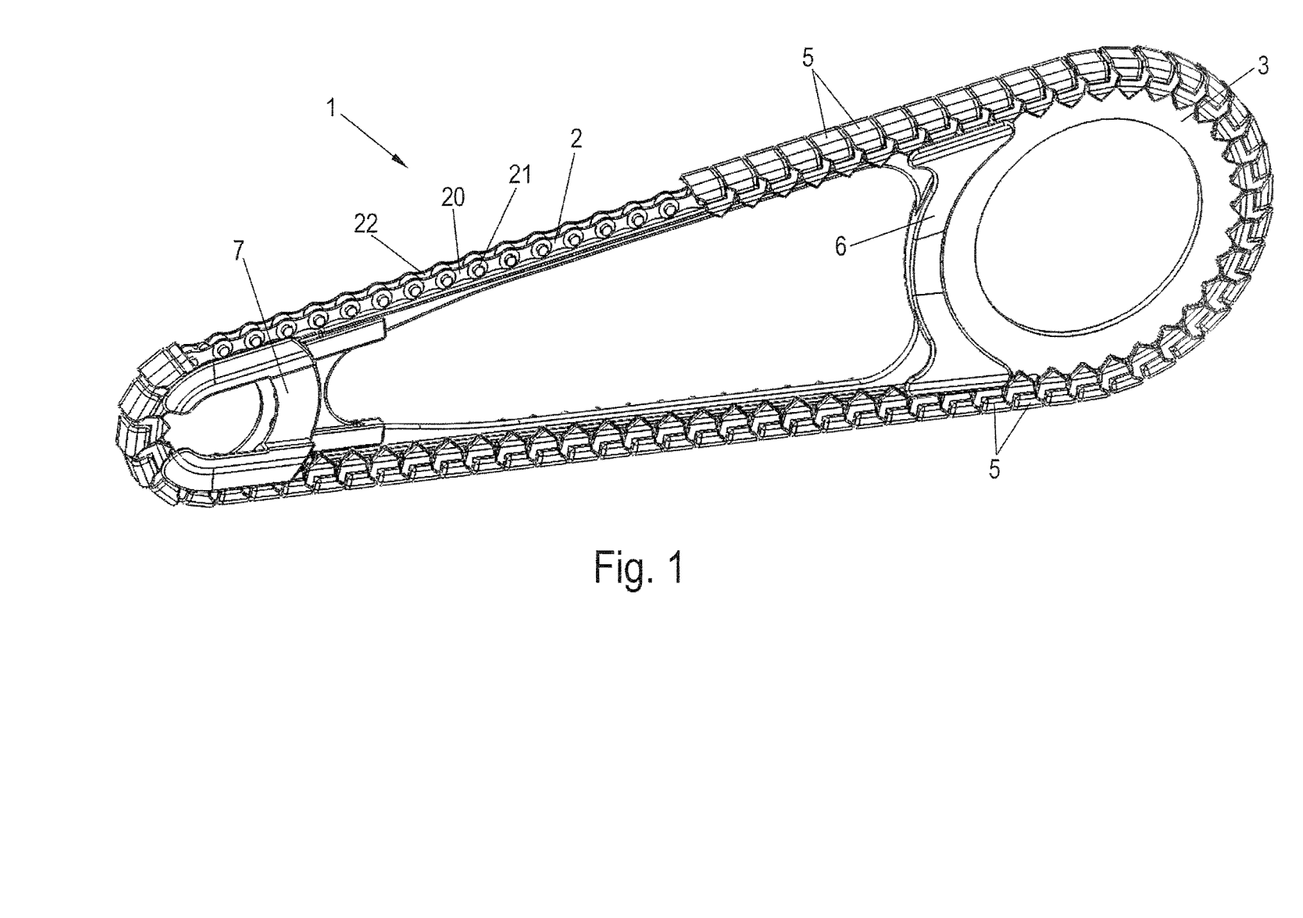
FIG. 1 shows a perspective view of a protective cover for a drive chain.

FIG. 1 depicts a protective cover 1 for a drive chain 2 that is installed in particular on a bicycle. The drive chain 2 is guided between a front larger sprocket 3 and a rear smaller sprocket 4 (FIG. 2), wherein the sizes of the sprockets 3 and 4 and the spacing of the sprockets 3 and 4 in relation to one another is variable in broad ranges, without deviating from the scope and spirit of the invention. To protect the drive chain 2 from soiling and increase the security, a plurality of protective elements 5 are provided, The plurality of protective elements 5 is moved together with the drive chain 2 and encompasses the drive chain 2 in a U shape. The protective elements 5 are formed as open at an inner region, so that individual teeth 30 on the sprocket 3 and teeth 40 on the sprocket 4 can engage with the drive chain 2.

The drive chain 2 comprises individual chain links 20, which are connected to one another via pins 21, wherein the teeth 30 and 40 engage in intermediate spaces 22 between two pins 21.

Figure 2:
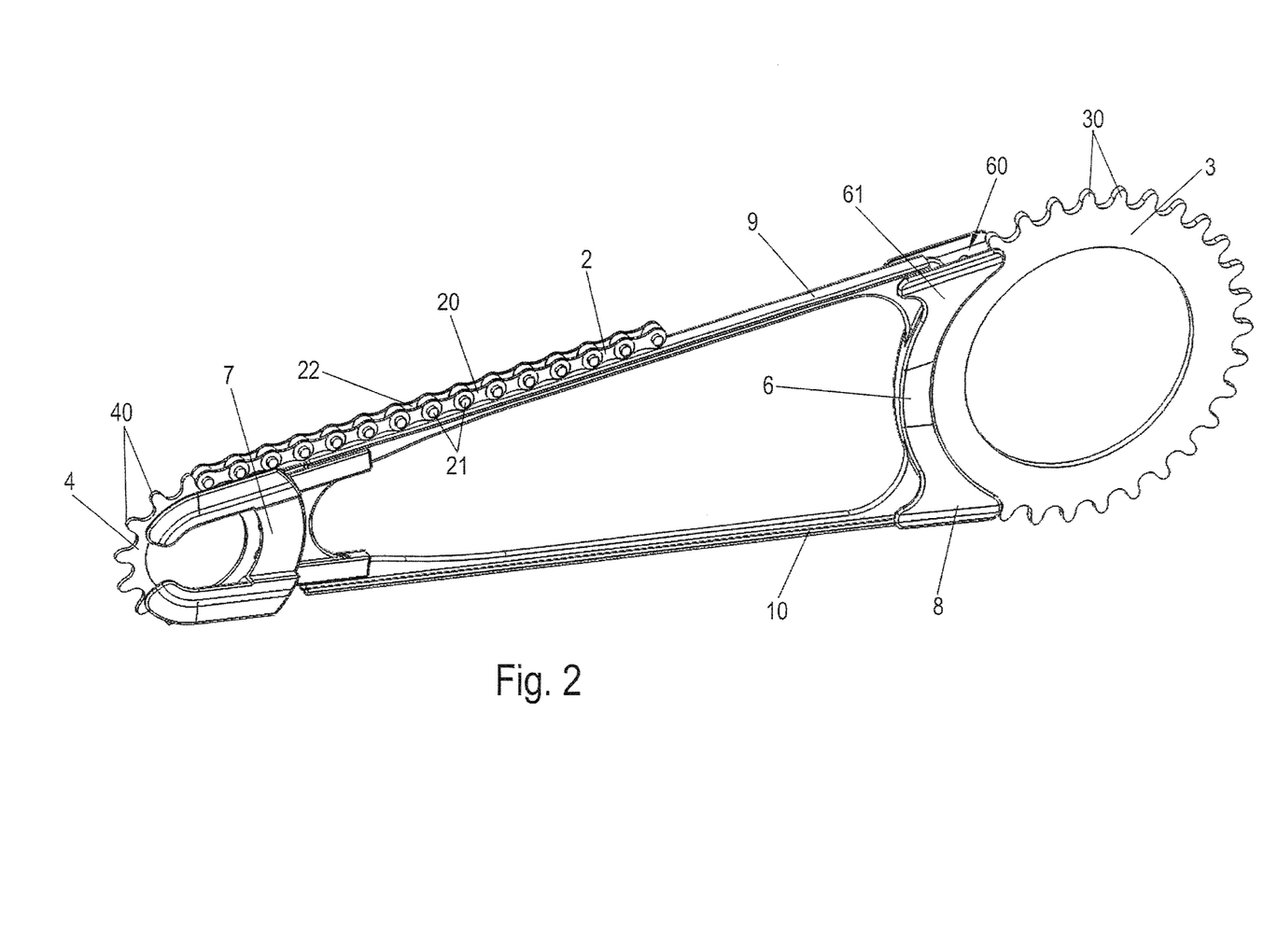
FIG. 2 shows a view of the protective cover of Fig. without protective elements.
Figure 3:
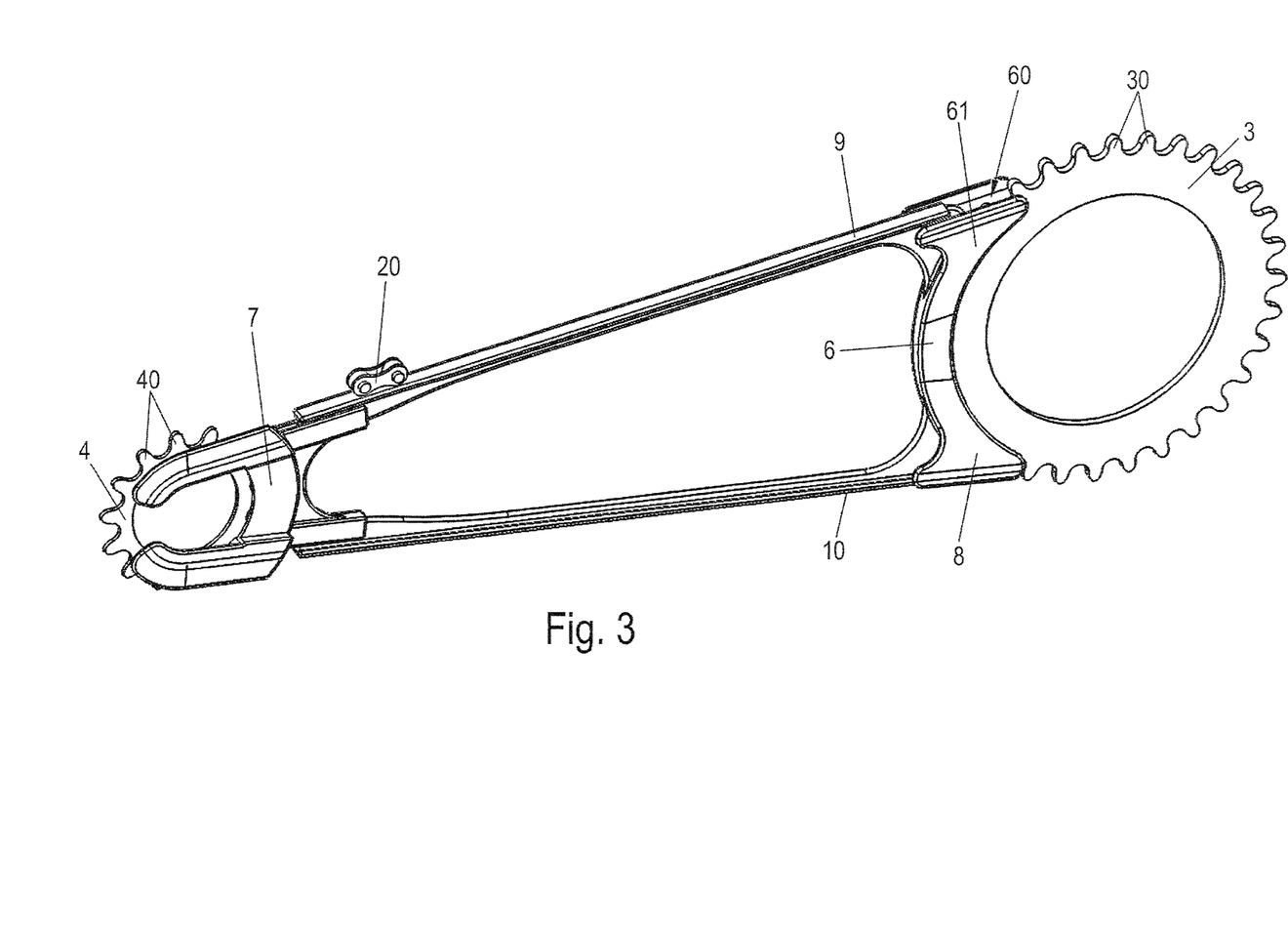
FIG. 3 shows a view of the protective cover of FIG. 1 without drive chain and protective elements.

As shown in FIG. 2, a cover element 6 is located on the larger sprocket 3, which laterally overlaps the teeth 30 in the region in which the drive chain 2 is not guided around the sprocket 3. In this region, the cover element 6 encloses the teeth 30 essentially in a U shape, wherein the drive chain 2 is guided at an upper intake 60 to the teeth 30 of the sprocket 3 and in this case lateral walls 61 of the cover element 6 prevent objects or body parts from entering the wedge-shaped gap between the sprocket 3 and the drive chain 2. Each wall 61 is arranged in this case at an intake of the drive chain 2 to the sprocket 3, while further walls 8 of the cover element 6 overlap, at an outlet, the drive chain 2 and the sprocket 3, and a wedge-shaped gap is also secured in this region, so that no objects or body parts can be inserted. In particular in bicycles which permit a reverse movement of the sprocket 3, injury or damage can thus be securely avoided both at the intake and also at the outlet of the drive chain 2 to or from the sprocket 3.

A cover element 7 also is provided at the rear, smaller sprocket 4, which overlaps the teeth 40 of the sprocket 4 at least in a region in which the drive chain 2 does not wrap around the sprocket 4. In addition, the cover element 7 is arranged so that a wedge-shaped gap between the drive chain 2 and the sprocket 4 is laterally covered both at an intake and also at an outlet.

Figure 4:
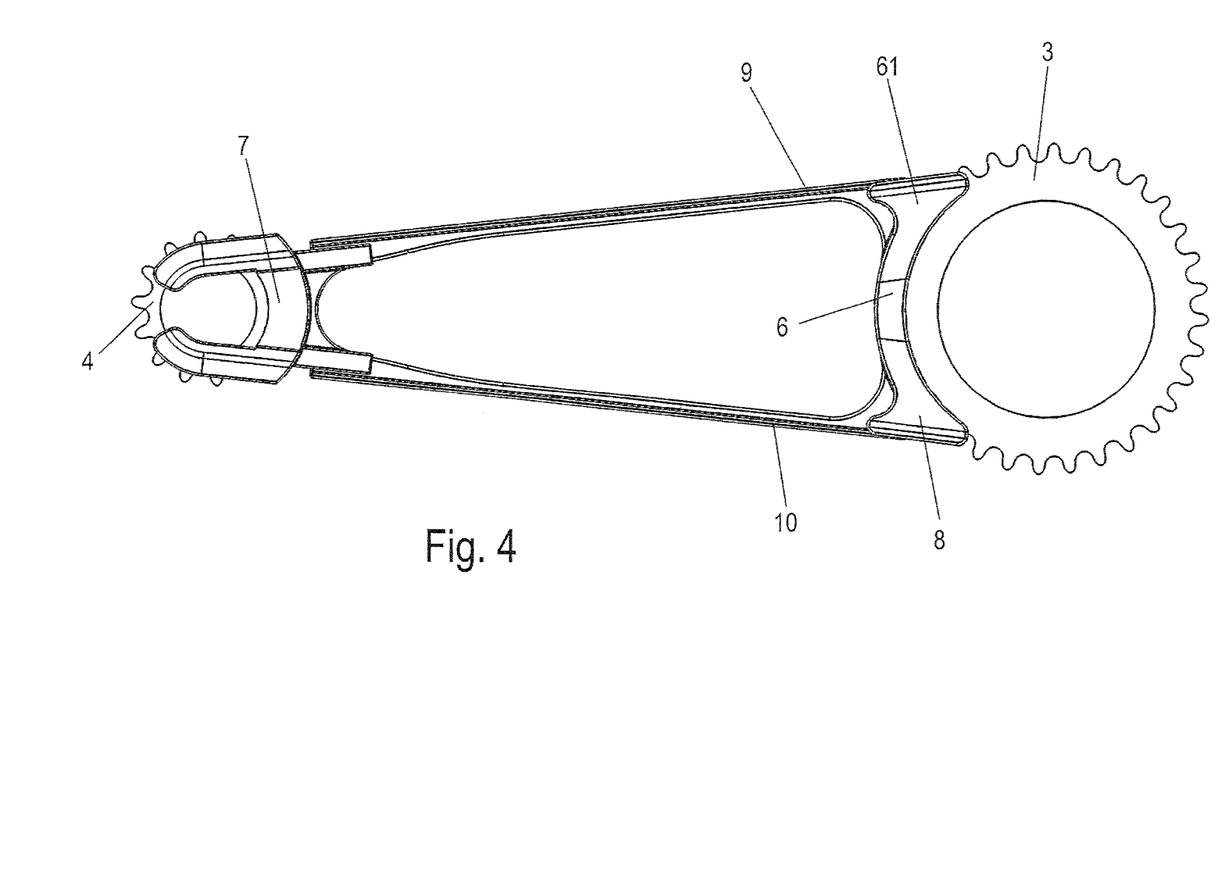
FIG. 4 shows a side view of the stationary cover elements of the protective cover from FIG. 1.
Figure 5:
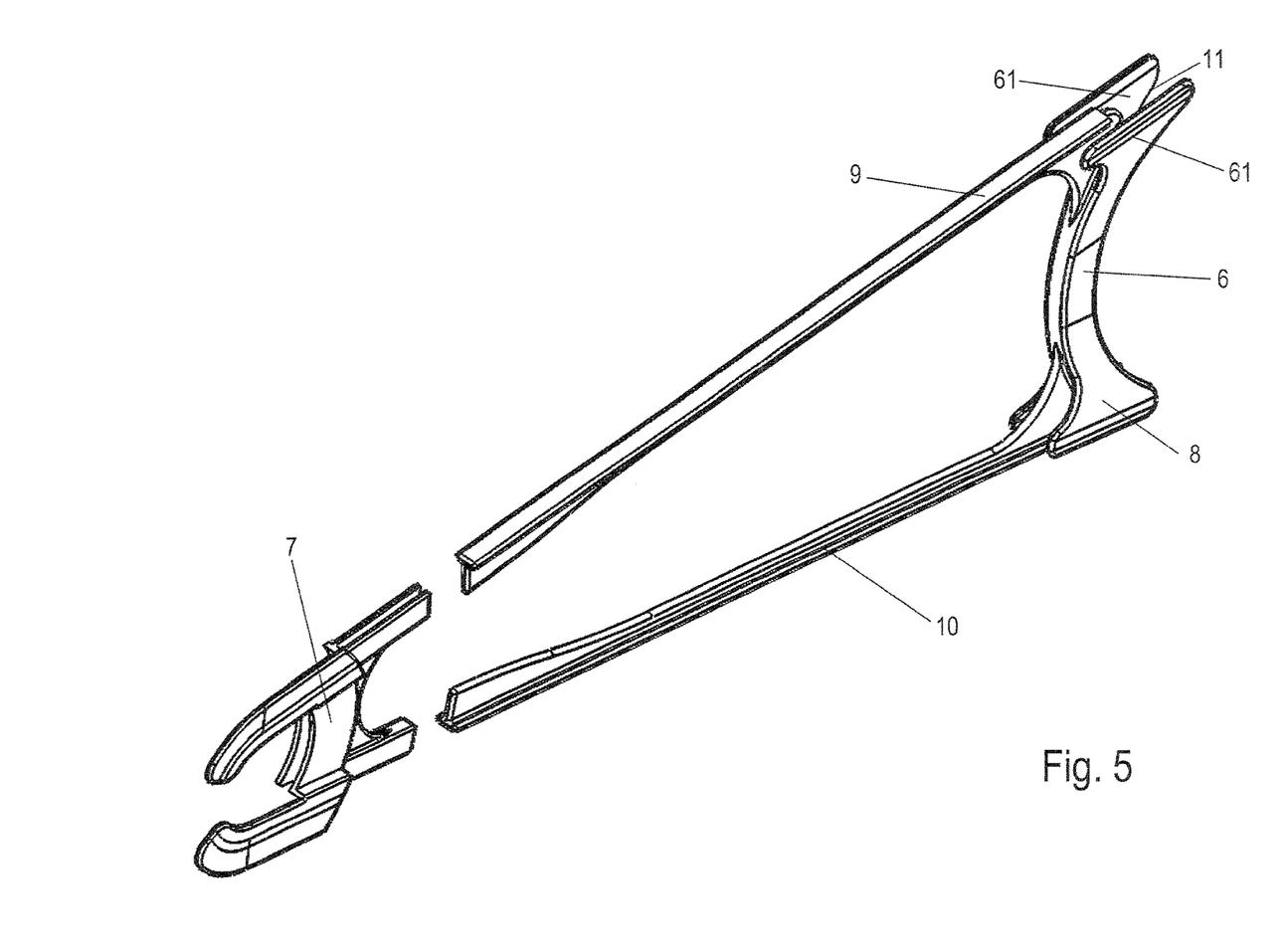
FIG. 5 shows a perspective view of the stationary cover elements.
Figure 6:
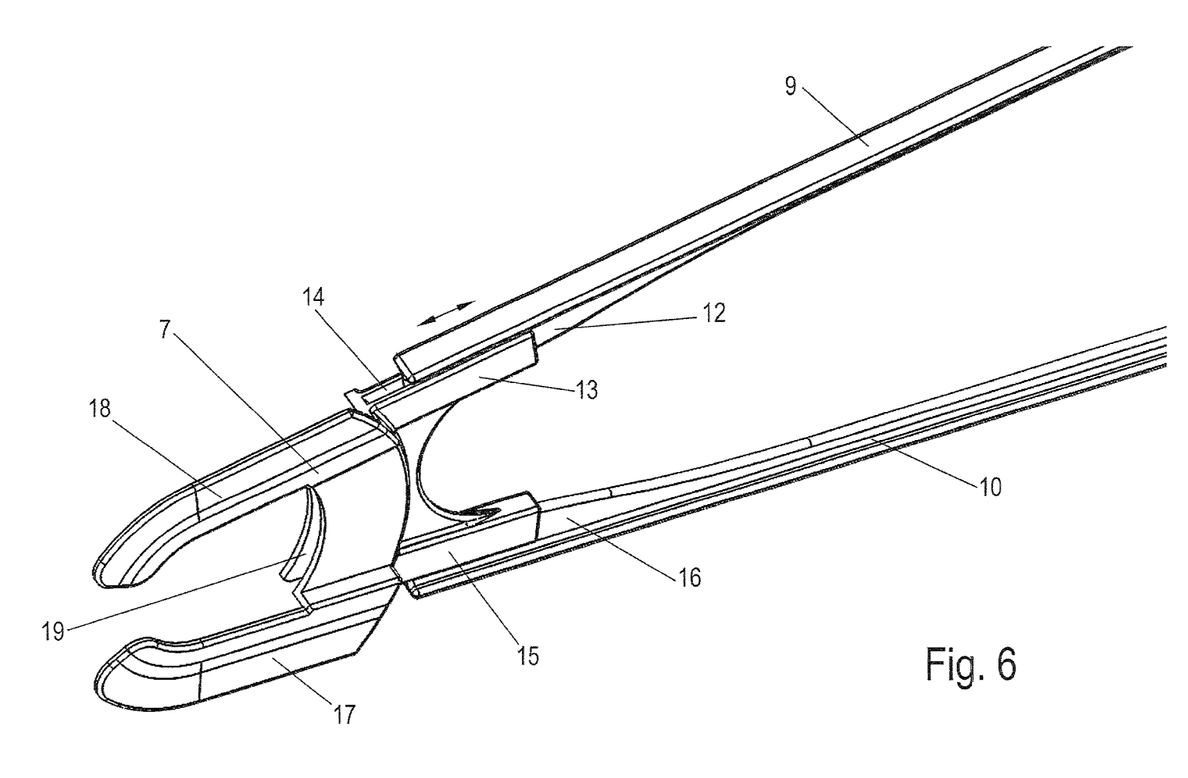
FIG. 6 shows a detail view of the cover elements from FIG. 5.

In FIGS. 4 to 6, the two cover elements 6 and 7 are shown without the drive chain 2. The cover elements 6 and 7 are installed inside the drive chain 2 and then held by the drive chain 2 and/or the sprockets 3 and 4. To guide the protective elements 5 essentially linearly, the protective cover has an upper guide strip 9 and a lower guide strip 10, which are integrally formed with the cover element 6, but can also be fixed as separate components on one of the cover elements 6 and 7.

In addition, the guide strips 9 or 10 also can be fixed on the rear cover element 7. The guide strip 9 and the guide strip 10 are used for guiding the protective elements 5, wherein the guide strips 9 and 10 are designed as T-shaped in cross section and engage in a corresponding receptacle on the protective elements 5. The lower guide strip 10 prevents sagging of the drive chain 2 in this case, since the protective elements 5 are held suspended on the guide strip 10.

The cover elements 6 and 7 are adjusted in relation to one another in length, wherein a web 12 is formed at the end on the upper guide strip 9 for this purpose. The web 12 is arranged in a groove 14 of a strip-shaped receptacle 13. The cover element 7 has a second receptacle 15, into which a web 16 on the lower guide strip 10 is inserted. The cover elements 6 and 7 can thus be displaced in relation to one another, as is schematically shown by the double arrow (FIG. 6), without a connection between the cover elements 6 and 7 being interrupted. Instead of a grooved receptacle 13 or 15, other holding units can be used for connecting the cover elements 6 and 7 and for adjusting the length.

Furthermore, FIG. 6 shows that the cover element 7 forms a slotted receptacle 19, which overlaps the sprocket 4 in the region in which the drive chain 2 does not press against the sprocket 4. The cover element 7 furthermore has two cantilevers 17 and 18, which laterally overlap the sprocket 4. The cantilevers 17 and 18 do not press against one another at the ends thereof, so that the cover element 7 is usable for sprockets 4 of different sizes. It is also possible to form the cover element 7 as ring-shaped.

Figure 7:
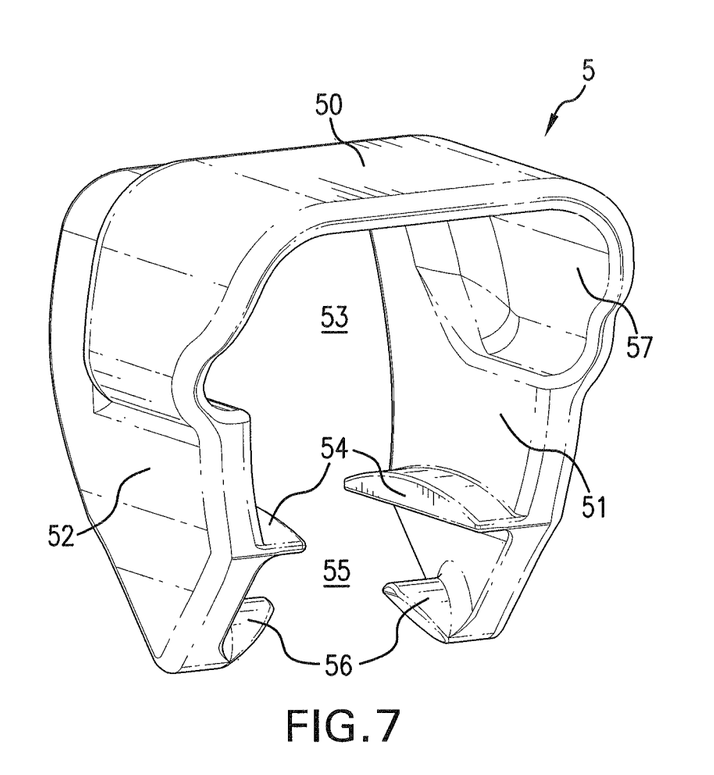
FIG. 7 shows a perspective view of a protective element of the protective cover from FIG. 1.

FIG. 7 shows a protective element 5, which is fixable on a chain link 20. The protective element 5 is designed as essentially U-shaped and has an outer cover 50, which is arranged in each case on the outer circumference of the revolving drive chain 2. Two side walls 51 and 52 extend from the outer cover 50 essentially perpendicularly toward an inner region, wherein projections 54 and 56, which are oriented inward, are provided on the side walls 51 and 52. A first chamber 53 is therefore formed on the protective element 5, which is delimited by the two side walls 51, 52, the outer cover 50, and the projections 54 and is used for accommodating the chain links 20. The chain links 20 can be arranged in this case having the protruding pin 21 in a receptacle 57, so that the protective element 5 is held essentially in a formfitting manner on the chain link 20.

Figure 8:
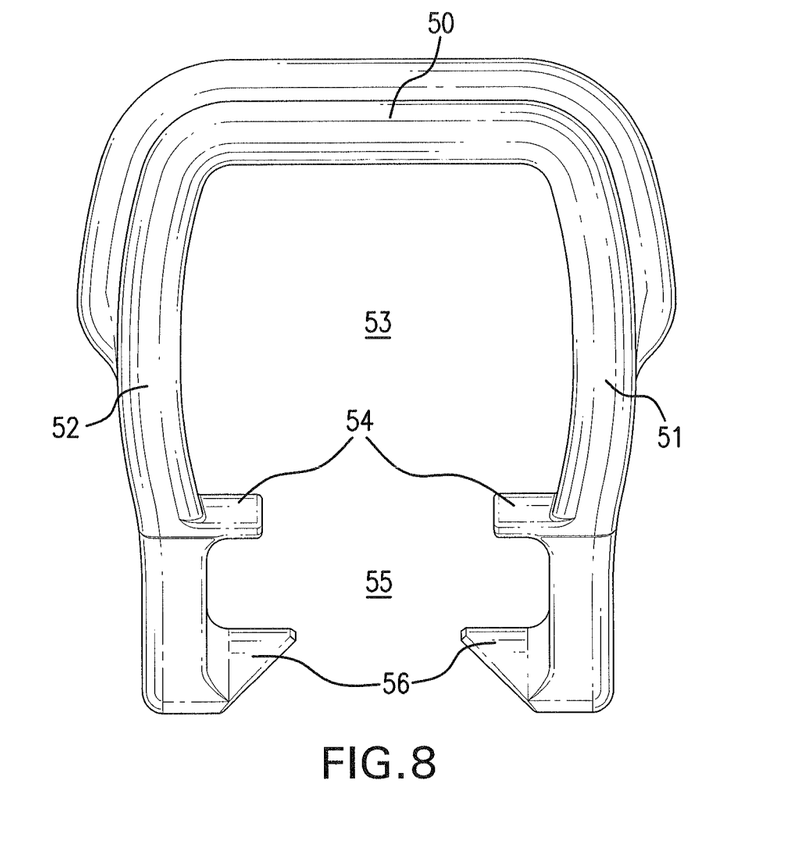
FIG. 8 shows a first view of the protective element from FIG. 7.

A second channel-shaped chamber 55 is provided adjacent to the chamber 53, as shown in particular in FIG. 8. This second chamber 55 extends between the spaced-apart projections 54 and 56 and the side walls 51 and 52. In this case, the projections 54 and 55 delimit a U-shaped receptacle, into which a web 54 of a guide strip 9 or 10 is insertable in each case. The protective elements 5 can thus each be guided on the guide strips 9 and 10. In particular, in the case of the lower guide strip 10, sagging of the drive chain 2 is therefore reduced via the protective elements 5.

Figure 9:
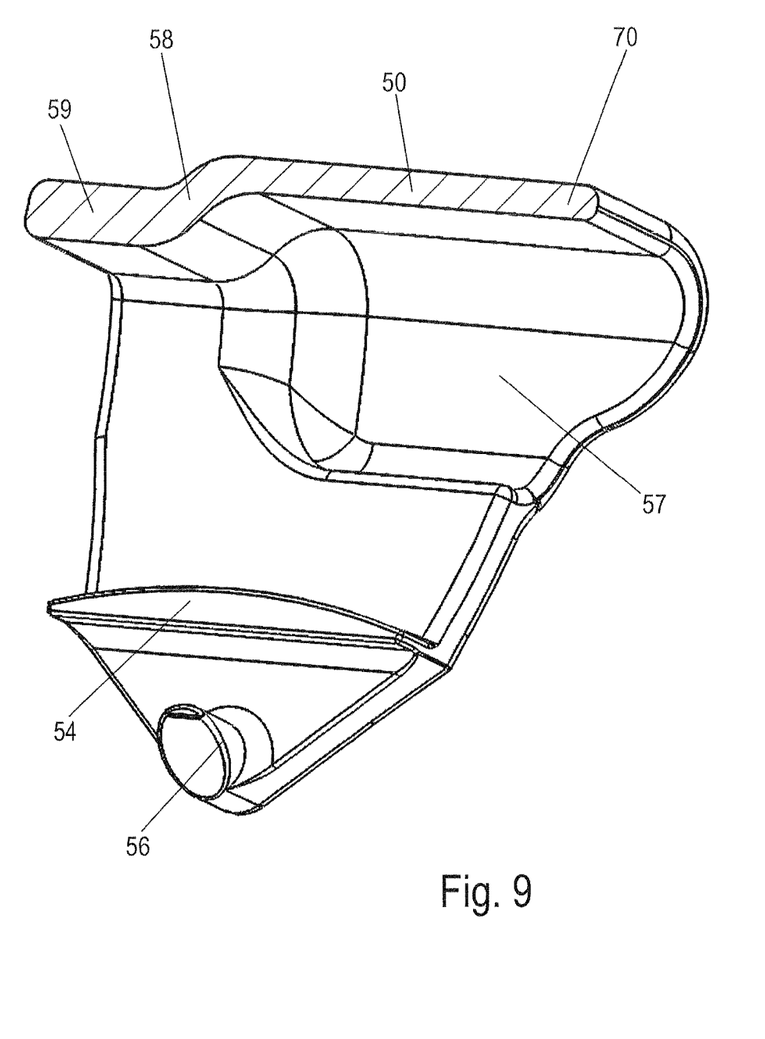
FIG. 9 shows a second view of the protective element from FIG. 7.

For installation, the protective elements 5 are installed by bending up the side walls 51 and 52, optionally may be locked and are therefore fixed in a captive manner on the drive chain 2. In order to avoid a gap formation between adjacent protective elements 5 in the region of the sprockets 3 and 4, the outer cover 50 is formed as stepped. A step 58 is provided, which is adjoined by an end section 59 arranged below an adjacent end section 70 of an adjacent protective element 5. A specific overlap by the end sections 70 and 59 thus results between adjacent protective elements 5, so that the protective elements 5 also form an engagement protector if they are arranged wrapped around the sprockets 3 and 4.

In the illustrated exemplary embodiments, the protective elements 5 and the cover elements 6 and 7 are produced as plastic parts. In this case, instead of two cover elements 6 and 7, more than two cover elements or only one single cover element also can be provided. Moreover, the division of the cover elements 6 and 7 also can extend in parallel to the longitudinal direction, i.e., in the plane formed by the drive chain 2.

Instead of the individual protective elements 5, tubular protective elements also can be used, which are movable together with the drive chain 2.

The shape of the cover elements 6 and 7 can moreover be adapted to the shape of the sprockets 3 and 4.

LIST OF REFERENCE NUMERALS 1 protective cover
2 drive chain
3 sprocket
4 sprocket
5 protective element
6 cover element
7 cover element
8 wall
9 guide strip
10 guide strip
12 web
13 receptacle
14 groove
15 receptacle
16 web
17 cantilever
18 cantilever
19 receptacle
20 chain link
21 pin
22 intermediate space
30 tooth
40 tooth
50 outer cover
51 side wall
52 side wall
53 chamber
54 projection
55 chamber
56 projection
57 receptacle
58 step
59 end section
60 intake
61 wall
70 end section As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A protective cover for a drive chain for a bicycle, comprising:
    a plurality of protective elements that encompass the drive chain and are movable together with the drive chain;
    at least one cover element that covers a gap between at least one sprocket of the bicycle and the drive chain,
    wherein the protective elements are guided at the at least one cover element, and wherein a receptacle is formed at the protective elements, into which at least one guide strip on the at least one cover element is inserted.

2. The protective cover according to claim 1, wherein the at least one cover element covers both a first gap at an intake of the drive chain onto the at least one sprocket of the bicycle and also a second gap at an outlet of the drive chain from the at least one sprocket of the bicycle.

3. The protective cover according to claim 1, wherein the protective elements each have a receptacle into which the at least one guide strip is inserted, on opposing side walls.

4. The protective cover according to claim 1, wherein the at least one cover element laterally overlaps the teeth of the at least one sprocket of the bicycle, at least in a region in which the drive chain does not wrap around the at least one sprocket.

5. The protective cover according to claim 1, wherein each of the protective elements is fixable on a chain link of the bicycle drive chain.

6. The protective cover according to claim 1, wherein the protective elements, the at least one cover element or both are produced from plastic.

7. A protective cover for a drive chain for a bicycle, comprising:
    a plurality of protective elements that encompass the drive chain and are movable together with the drive chain;
    at least one cover element that covers a gap between at least one sprocket of the bicycle and the drive chain,
    wherein the at least one cover element comprises a first cover element and a second cover element, wherein the at least one sprocket of the bicycle comprises a first sprocket and a second sprocket and wherein the first cover element at least regionally overlaps the first sprocket and the second cover element at least regionally overlaps the second sprocket,
    wherein the first cover element and the second cover element are adjustable in relation to one another in length and are displaceable one inside another.

8. A protective cover for a drive chain for a bicycle, comprising:
    a plurality of protective elements that encompass the drive chain and are movable together with the drive chain;
    at least one cover element that covers a gap between at least one sprocket of the bicycle and the drive chain,
    wherein the at least one cover element comprises a first cover element and a second cover element, wherein the at least one sprocket of the bicycle comprises a first sprocket and a second sprocket and wherein the first cover element at least regionally overlaps the first sprocket and the second cover element at least regionally overlaps the second sprocket, and wherein the bicycle drive chain is supported between the first sprocket and the second sprocket in a lower chain strand by the protective elements and wherein the protective elements are displaceable along a guide strip.

9. A bicycle drive, comprising:

a drive chain guided around a first and a second sprocket of a bicycle; and a protective cover for the drive chain, wherein the protective cover comprises:

a plurality of protective elements that encompass the drive chain and are movable together with the drive chain;

at least one cover element that covers a gap between at least one sprocket of the bicycle and the drive chain wherein the protective elements are guided at the at least one cover element, and wherein a receptacle is formed at the protective elements, into which at least one guide strip on the at least one cover element is inserted.

* * * * *